J. LAWRENCE.
OVEN.
APPLICATION FILED NOV. 9, 1911.
1,069,441.
Patented Aug. 5, 1913.
2 SHEETS—SHEET 1.
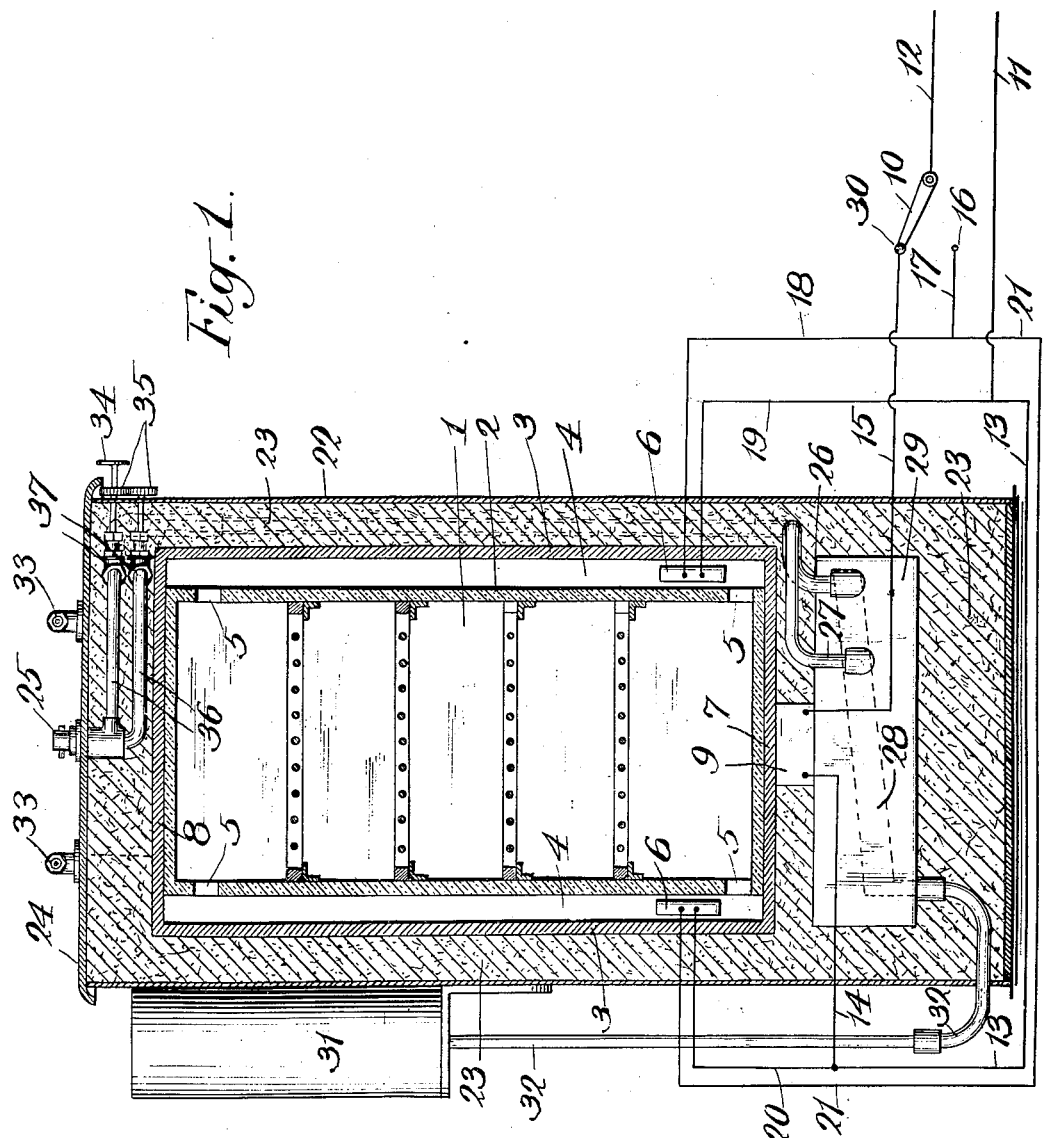
WITNESSES:
INVENTOR
James Lawrence
BY
Kenyon & Kenyon
ATTORNEYS J. LAWRENCE.
OVEN.
APPLICATION FILED NOV. 9, 1911.
1,069,441.
Patented Aug. 5, 1913.
2 SHEETS—SHEET 2.
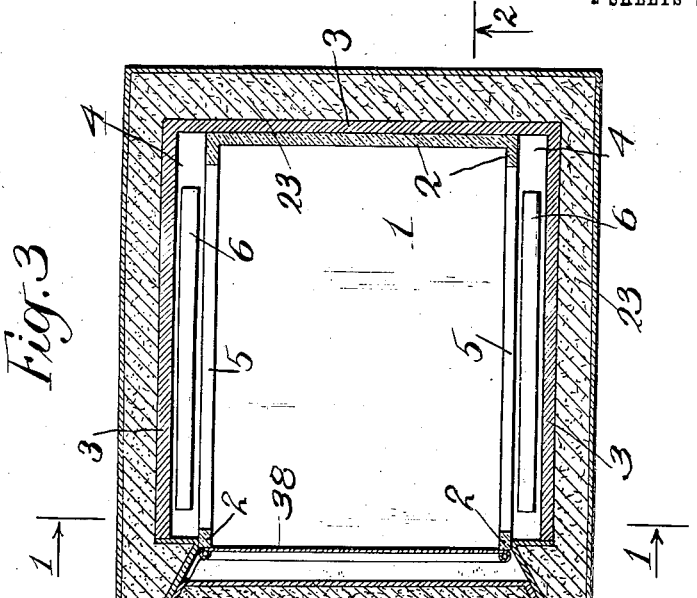
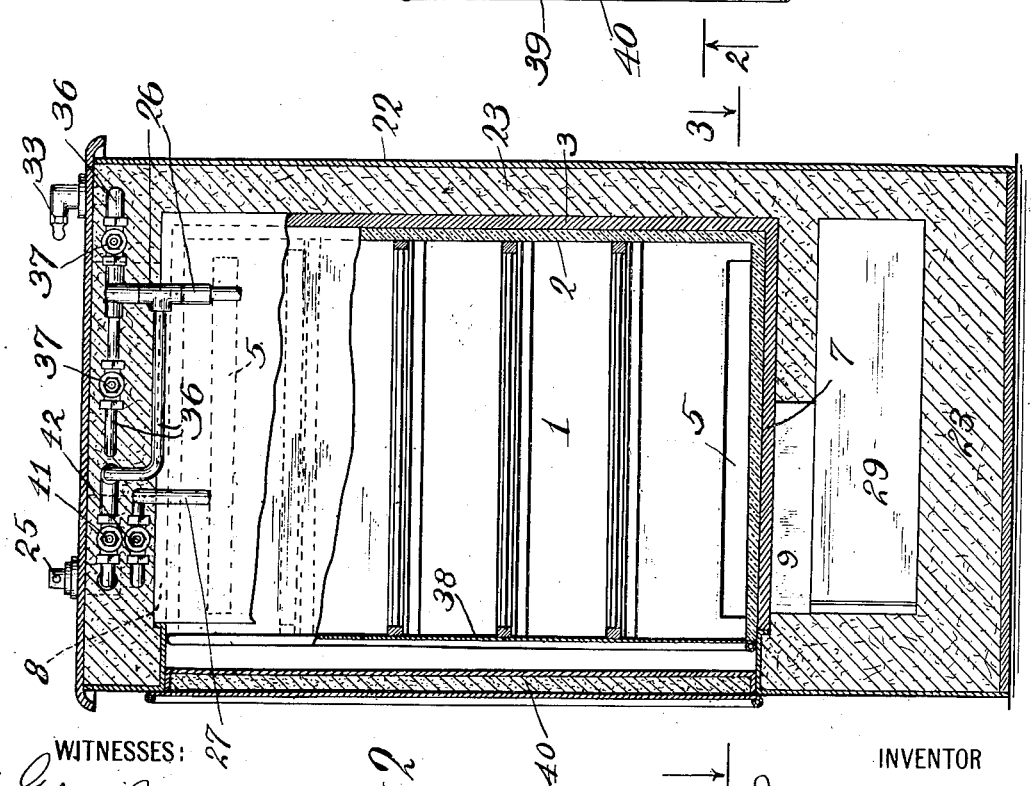
INVENTOR
James Lawrence
BY
Kenyon & Kenyon
ATTORNEYS
WITNESSES:

UNITED STATES PATENT OFFICE.

JAMES LAWRENCE, OF LONDON, ENGLAND, ASSIGNOR TO ELECTRIC HEAT STORAGE COMPANY, A CORPORATION OF NEW YORK.

OVEN.

1,069,441.  Specification of Letters Patent.  Patented Aug. 5, 1913.

Application filed November 9, 1911. Serial No. 659,269.

*To all whom it may concern:*

Be it known that I, JAMES LAWRENCE, a subject of the King of Great Britain, and a resident of Bedford Park, W., London, England, have invented a new and useful Improvement in Ovens, of which the following is a specification.

My improvement relates to ovens.

My invention has for its object to provide means for producing and maintaining a circulation of heated air in an oven.

It consists in the novel devices herein shown and described.

My invention is of special value in ovens electrically heated, although it is not limited to such ovens.

In the accompanying drawings I have shown my improvement in its preferred form as embodied in an oven adapted to be electrically heated.

Referring to these drawings which form a part hereof, Figures 1 and 2 are vertical sections through such oven, taken at right angles to each other, Fig. 1 being taken on the lines 1—1 of Fig. 3 and Fig. 2 taken on the lines 2—2 of Fig. 3, the electrical connections and certain other parts being omitted from Fig. 2 for the sake of clearness; and Fig. 3 is a horizontal section taken on the lines 3—3 of Fig. 2.

In my improved oven I provide at one or more of the sides or along the periphery of the oven, an air flue connecting at the bottom and the top with the main part of the oven. In this air flue I place a heating element, preferably electrically heated and preferably arranged in the center of the air flue at or near its lower end, in order to induce and maintain a circulation of heated air through the air flue and in the oven.

Referring to the specific embodiment of my invention shown in the drawings, 1 is the main part of the oven. The oven is provided with an inner wall 2, preferably of some suitable heat refractory material such as fire clay or porcelain, and with a surrounding wall 3, preferably of some suitable heat storage material, such as iron, and the two walls are arranged with an intervening space 4 forming an air flue. In the specific embodiment of my invention, I have shown two of these air flues arranged on opposite sides of the oven. One or more of such air flues can be used as desired, or the air flue can entirely surround the inner wall 2 if desired. Each air flue is connected at the bottom and top with the main part of the oven. As shown, this is through openings 5, 5. There may be as many of these openings and they may be shaped and arranged in any desired manner.

I preferably arrange a heating element 6 in each flue and preferably place it at the center of the air flue at or near its lower end. In the form shown, these heating elements are electric heating elements. The surrounding heat storage wall 3 is connected at the bottom by a bottom plate 7 and at the top by a top plate 8, made of the same heat storage material.

9 is a heating element for heating the heat storage material of the bottom, surrounding wall and top. This heat storage material is preferably made of sufficient mass so as to be heated by a small amount of current during a long period of time such as the non-peak hours and to store the heat in sufficient amount for use at any time. This heat is utilized, whenever desired, for cooking purposes, preferably at a rate faster than heat is supplied to the heat storage mass by its heating element.

I preferably provide means for switching the current from the heating element 9 to heating elements 6, or vice versa. When the oven is not in use, the heating element 9 will be alone connected in circuit.

10 is the switch, 11 and 12 the electric mains.

When heating element 9 is alone in circuit, the circuit runs from wire 11 through wires 13 and 14 to heating element 9, thence through wire 15 to switch 10 and main 12. By throwing the switch 10 to contact 16, the circuit through heating element 9 is broken at contact 30, and circuits through heating elements 6, 6 are made at contact 16. These circuits run as follows: from switch 10, contact 16, through wires 17, 18, one heating element 6, wire 19 to main 11, and from switch 10 through contact 16, wires 17, 21 to the other heating element 6 and back through wires 20 and 13 to main 11.

In practice heating element 9 is connected with the electric mains during the non-peak hours when electricity can be supplied at the lowest rates, and the heat storage mass is heated slowly until a large amount of heat is stored in it. When it is desired to use the oven for cooking purposes, the current is switched onto the heating elements 6. This induces an upward flow of heated air in the air flues, and this heated air passes into the oven at the top through the openings 5 and down through the oven and out through the openings 5 at the bottom where the spent heated air is again heated, and this process is repeated. During this cooking operation the heat is also drawn from the heat storage mass for cooking purposes. Thus a constant circuit of heated air is maintained in the oven and the freshly heated air is constantly brought to the best point to utilize its heat for cooking purposes, and the spent heated air is returned to the point where it can be reheated. By this arrangement, cooking can be economically and efficiently carried on.

The heating elements may be made of any suitable material or construction and may be heated by any suitable means, although I prefer to use electricity for that purpose. The inner wall 2 may be made of any suitable material, although I have found in practice that a heat refractory material, such as fire clay or porcelain is well adapted for the purpose, as it gives excellent results in cooking. The material of the outer wall is preferably a heat storing material such as iron, although any suitable material may be used for the purpose, and any suitable heat storage material may in that case be used and be constructed, placed and arranged as desired.

22 is the outer casing of the apparatus and 23 is any suitable heat insulating material.

24 is the cover. This may be provided, if desired, with any suitable means for doing outside cooking such, for example, as steam cooking. I have shown for this purpose a bayonet joint 25 adapted to connect with any suitable removable cooking vessel and connected by pipes 26 and 27 with a water heating and steam generating chamber 28 in a heat storage mass 29.

Water is supplied to the chamber 28 from tank 31 through pipe 32. The steam from chamber 28 passes through pipe 26 to joint 25 and then may pass to any appropriate vessel, and the water of condensation returns through the joint 25, pipe 27 back to chamber 28 to be again converted into steam.

33 represents valves or joints to connect with the interior of cooking vessels where steam is brought into contact with the article being cooked.

34 represents a valve wheel operating through gears 35 to control valves 41 and 42 for bayonet joint 25.

36, 36 represent branch pipes from pipe 26 and 37, 37 represent valves in such branch pipes 41 is a valve in pipe 27.

In this construction, the heating element 9 heats the storage mass 29 as well as the storage mass of the oven proper.

38 is the inner door of the oven 1 hinged at one side and 39 is an outer door provided with insulating material 40 and hinged as shown.

What I claim as new and desire to secure by Letters Patent, is:

An oven provided with an inner wall of refractory material having an opening at the top and bottom connecting with the oven, and with a surrounding wall of heat storage material, the two walls arranged with an intervening space having an air flue for the circulation of heated air through the air flue and oven.

In testimony whereof, I have signed my name to this specification, in the presence of two subscribing witnesses.

JAMES LAWRENCE.

Witnesses:
 HERBERT D. JAMESON,
 CLARENCE P. LIDDON.